United States Patent [19]

Christie et al.

[11] Patent Number: 5,891,376
[45] Date of Patent: Apr. 6, 1999

[54] FILM PROCESS

[75] Inventors: Gregor Bruce Yeo Christie, Middle Park; Victor Christov, Reservoir; Stewart Geoffrey Carson, Keysborough; Penelope Anne Corrigan, Springvale; Simon Gerard Hardin, North Fitzroy; Meltem Yesim Gozukara, Mulgrave, all of Australia

[73] Assignee: Commonwealth Scientific and Industrial Research Organisation, Campbell, Australia

[21] Appl. No.: 615,268

[22] PCT Filed: Sep. 2, 1994

[86] PCT No.: PCT/AU94/00521

§ 371 Date: Aug. 19, 1996

§ 102(e) Date: Aug. 19, 1996

[87] PCT Pub. No.: WO95/07949

PCT Pub. Date: Mar. 23, 1995

[30] Foreign Application Priority Data

Sep. 17, 1993 [AU] Australia ............... PM1270

[51] Int. Cl.⁶ .................................................. B29C 71/00
[52] U.S. Cl. .................. 264/234; 264/235.6; 264/235.8; 524/494; 524/423; 524/425; 524/430
[58] Field of Search .................................. 524/423, 425, 524/442, 430, 443, 445, 448, 492, 493, 494, 495, 503, 514; 264/234, 235.6, 235.8

[56] References Cited

U.S. PATENT DOCUMENTS

| 3,975,455 | 8/1976 | Falender et al. ............... 260/827 |
| 4,264,672 | 4/1981 | Taylor-Brown et al. ........... 428/310 |
| 4,364,985 | 12/1982 | Tokuyama et al. ............... 428/149 |
| 4,618,528 | 10/1986 | Sacks et al. .................. 428/216 |
| 4,696,857 | 9/1987 | Sibilia et al. ................ 428/323 |
| 4,748,194 | 5/1988 | Geeck ......................... 523/427 |
| 4,842,875 | 6/1989 | Anderson ...................... 426/118 |
| 4,910,032 | 3/1990 | Antoon et al. ................. 426/118 |
| 4,923,703 | 5/1990 | Antoon, Jr. ................... 426/118 |

FOREIGN PATENT DOCUMENTS

| 41561/89 | 9/1989 | Australia . |
| 54583/90 | 5/1990 | Australia . |
| 0 218 236 | 10/1986 | European Pat. Off. . |
| 0 311 423 | 10/1988 | European Pat. Off. . |
| 2-058549 | 8/1988 | Japan . |
| 2-58549 | 8/1988 | Japan . |
| 2 219 185 | 8/1987 | United Kingdom . |
| WO 91/03516 | 3/1991 | WIPO . |
| WO 91/18835 | 12/1991 | WIPO . |
| WO 92/02580 | 2/1992 | WIPO . |
| WO 92/13890 | 8/1992 | WIPO . |

OTHER PUBLICATIONS

Zagory, et al, "Design of Polymeric Packages for Modified Atmosphere Storage of Fresh Produce," (Prac. 5th International Conference, Jun. 14–16, 1989, Wenatchee, Washington), (9 pages).

Primary Examiner—James J. Seidleck
Assistant Examiner—U. K. Rajguru
Attorney, Agent, or Firm—McDermott, Will & Emery

[57] ABSTRACT

A controlled permeability film and process for producing same wherein the film includes: a film forming polyolefin polymer; and an inert porous filler in an amount effective to reduce the ratio of the carbon dioxide permeability and water permeability to the oxygen permeability of the film, wherein the filler has a particle size greater than the intrinsic film thickness of the film forming polymer; the controlled permeability film being further modified to reduce the $CO_2/O_2$ permeability ratio to approximately 0.5 to 2.0.

25 Claims, No Drawings

FILM PROCESS

The present invention relates to a method of producing improved controlled permeability films and to improved films produced thereby.

Control of carbon dioxide ($CO_2$) and/or oxygen ($O_2$) concentration around stored products has been shown in the prior art to increase the storage life thereof. For example conditions for the optimal storage of horticultural commodities are influenced by factors which include crop species, cultivar, growing conditions, maturity, quality, temperature, relative humidity, packaging, and storage duration. Storage under controlled and modified atmosphere is influenced by the concentration of oxygen, carbon dioxide, ethylene, water vapour and other gases. Controlled atmosphere (CA) storage is achieved by externally supplying a gas stream of the required $O_2$ and $CO_2$ concentration into the storage cold room. Controlled atmosphere research into broccoli, for example, has shown that oxygen levels below approximately 1% and $CO_2$ levels higher than approximately 15% independently induce offensive off-odours and off-flavours. Reported optimum $O_2$ and $CO_2$ concentrations for broccoli range from approximately 1 to 2.5% and approximately 5 to 10% respectively. Controlled atmosphere packaging achieves extended produce life because of effects such as slowing respiration and inhibiting pathogen growth.

It is also known in the prior art that $CO_2$ and $O_2$ atmospheres surrounding produce can be modified by utilizing the respiration behaviour of the produce where $O_2$ is converted to $CO_2$. With modified atmosphere (MA) packaging, produce is stored in polymeric film where the film permeability is exactly matched to the expected respiration behaviour as influenced by temperature and atmosphere changes to provide the optimum $CO_2$ and $O_2$ atmosphere. The accumulated $O_2$ and $CO_2$ concentration in such a package will be related to the rate at which $O_2$ and $CO_2$ is consumed or generated by the produce and the container permeability by a simple mass balance. The sensitivity of this balance to $O_2$ and $CO_2$ permeability and the possibility of producing commodity polymer films requires highly consistent and economic manufacturing of controlled permeability films.

Another use of controlled permeability films is for the storage of nematodes. As disclosed in co-pending application number PCT/AU92/00041, the entire disclosure of which is incorporated herein by reference, nematodes may be successfully packed for storage and transport using films according to the present invention.

In International Patent Application PCT/AU91/00346, to the applicants, the entire disclosure of which is incorporated herein by reference, there is disclosed a controlled permeability film including a film forming polymer and optionally including a dispersing polymer; and an inert porous filler optionally having a surface modifying agent coated thereon, the inert porous filler being present in an amount effective to reduce the ratio of the carbon dioxide permeability to the oxygen permeability of the film, and wherein the filler has a particle size greater than the intrinsic film thickness of the film forming polymer. A composite packaging article and a packaged produce product are also disclosed.

Such films of controlled permeability have been partially successful, however, their success has been limited by a continued difficulty in producing consistent film permeabilities throughout the film and difficulties in controlling film thickness.

Accordingly it is an object of the present invention to overcome, or at least alleviate, one or more of the difficulties related to the prior art.

Accordingly, in a first aspect of the present invention there is provided a controlled permeability film including;

a film forming polyolefin polymer; and an inert porous filler in an amount effective to reduce the ratio of the carbon dioxide ($CO_2$) permeability to the oxygen ($O_2$) permeability of the film, wherein the filler has a particle size greater than the intrinsic film thickness of the film forming polymer; the controlled permeability film being further modified to reduce the $CO_2/O_2$ permeability ratio to approximately 0.5 to 2.0.

Preferably the $CO_2/O_2$ permeability ratio is reduced to approximately 0.5 to 1.5.

It is noted that the $CO_2/O_2$ permeability ratio of most unmodified polymers is in the order of 4 to 6.

It will be further understood that a reduced permeability ratio results in a film having a more consistent permeability performance throughout.

In a further aspect of the present invention a process for preparing a controlled permeability film which includes providing a film forming polyolefin polymer; and an inert porous filler in an amount effective to reduce the ratio of the carbon dioxide ($CO_2$) permeability to the oxygen ($O_2$) permeability of the film, and wherein the filler has a particle size greater than the intrinsic film thickness of the film forming polymer;

mixing the polyolefin polymer and inert porous filler at elevated temperature;

forming the mixture into a film; and subjecting the film to a permeability modifying step such that the $CO_2/O_2$ permeability ratio is reduced to approximately 0.5 to 2.0.

The permeability modifying step may include a pressure treatment, a heat treatment or stretching treatment, or a combination thereof.

In a preferred form the permeability modifying step may include contacting the film with a pressure plate or roller.

The contacting step may be conducted at room temperature or at elevated temperature. The contacting step may be conducted at a temperature of from approximately 10° C. to 200° C., preferably approximately 75° C. to 115° C.

The pressure plate or roller may apply a compressive force to the film. The compressive force is preferably sufficient to thin or remove film forming material between the filler particles and the surrounding atmosphere. The compressive force applied may be in the range approximately 2.5 kg to 100 kg, preferably approximately 5 kg to 75 kg.

A roller treatment is preferred as this may provide a film having a more consistent thickness.

Alternatively, or in addition, the permeability modifying step may include subjecting the film to a uniaxial stretching. The stretching force applied may be approximately 2.5 kg to 75 kg, preferably approximately 5 kg to 50 kg.

The term "intrinsic film thickness" as used herein refers to the calculated thickness of the polymeric film. The intrinsic film thickness is the thickness the polymer would have if the filler was not there.

By the term "film" as used herein we mean a film, sheet or like article.

The film forming polyolefin polymer of the controlled permeability film may be of any suitable type. The film forming polymer may be selected from polyethylene and blends of polyethylene with polyesters including polyethylene terephthalate and polybutylene terephthalate, vinyl polymers including polyvinyl chloride, polyvinyl acetate, ethylene-vinyl acetate copolymers and ethylene-vinyl alcohol copolymers, polycarbonates and polystyrenes and polyalkylene oxide polymers, including polyethylene oxide polymer. Preferably the film forming polyolefin is a polyethylene, more preferably a low density polyethylene.

The inert porous filler may be of any suitable type. The inert porous filler may be an organic or inorganic filler. The inert porous filler may be a naturally-occurring porous material or synthetic porous material. The naturally-occurring porous materials may be selected from inorganic materials, such as pumice, tuff, rhyolite, dacite, reticulite, scoria, lapilli, agglomerate, perlite, pumicite, other volcanic rocks, natural zeolites or sandstones and organic materials, such as coal, char, charcoal, starch, seaweed, polymeric carbohydrates. The synthetic materials may be selected from porous glasses such as "Vycor", clays modified to produce porosity, silicate phases, such as cordierite or mullite or metal oxides, such as alumina, silica, zirconia or magnesia, or cerium compounds, or hydrophilic organic polymers, such as polyvinyl alcohol or polyacrylamide. Synthetic metallic compounds such as alumina, aluminum isopropoxide and $Ce(NO_3)_3$ derivatives may be used as described below. Inorganic fillers selected from alumina, silica, pumice, natural zeolites or derivatives thereof are preferred.

A mineral filler is preferred for modifying $CO_2/O_2$ permeability ratios. A pumice product may be used. Particles having a particle size greater than the intrinsic film thickness of the film forming polymer has been found to be particularly suitable. Whilst we do not wish to be restricted by theory, it is postulated that filler particles having a diameter greater than the intrinsic film thickness of the film forming polymer may provide improved properties including higher permeabilities, better permeability-temperature behaviour, more consistent film properties and better carbon dioxide/oxygen permeability ratios.

In a preferred aspect of the present invention the inert porous filler may be modified to alter its permeability characteristics. The inert porous filler may be subjected to leaching and/or burning treatment to increase porosity. The inert porous filler may be modified to render it hydrophobic.

Accordingly, in a further aspect of the present invention the inert porous filler includes a surface modifying agent coated thereon in an amount effective to modify the surface behaviour of the porous filler.

In a preferred aspect, the modified porous filler is present in an amount sufficient to reduce the carbon dioxide to oxygen permeability ratio of the controlled permeability film.

The surface modifying agent may reduce the adhesion of the film forming polymer to the porous filler, which may result in the formation of depressions in the film.

The depressions may impart microperforations to the controlled permeability film. The net effect of the surface modifying agent is thus a reduction in the effective film thickness. The carbon dioxide to oxygen permeability ratio for the controlled permeability film may also be altered.

The surface modifying agent may be any suitable agent capable of modifying the surface of the inert porous filler. Preferably, the agent is suitable to render the surface of the porous filler hydrophobic. The surface modifying agent may be an organic or an inorganic polymeric material, for example polyolefins, particularly polyethylenes, and oxygenated polyethylene for example polyethylene glycols, nonyl phenyl polyethylene oxide, polyvinyl alcohols, polyvinyl acetates, paraffins, polysiloxanes and silane coupling agents, metal alkoxides such as those of titanium and aluminium, alcohols such as n-butanol, and combinations thereof.

The surface modifying agent should be used in a sufficient amount to coat at least 10% of the surface of the inert porous filler. The surface modifying agent or combination of surface modifying agents may be added in quantities greater than needed to coat the total surface so as to fill or partially fill the available pore volume.

In an alternative aspect of the present invention there is provided a controlled permeability film composition including a composite film including
a film forming polyolefin polymer; and
a dispersing polymer; and
an inert porous filler in an amount effective to reduce the ratio of the carbon dioxide ($CO_2$) permeability to the oxygen ($O_2$) permeability of the film, and wherein the filler has a particle size greater than the intrinsic film thickness of the composite film; the controlled permeability film being further modified to reduce the $CO_2/O_2$ permeability ratio to approximately 0.5 to 2.0.

Generally, the dispersing polymer should not be compatible with the film forming polymer so that with appropriate blowing techniques, it forms distinct sections within the composite film. The inclusion of a dispersing polymer may affect the characteristics of the polymeric film. For example, where a linear low density polyethylene (LLDPE) film has been combined with a less dense polyethylene (e.g. linear very low density polyethylene) this may lead to an increase in the oxygen permeability of the film. The inclusion of a less viscous polyethylene (e.g. high pressure low density polyethylene) may lead to a thinning of the film.

Suitable polymeric material that may be combined to form a composite film include polyolefins of differing grades. Particularly preferred polyolefins are polyethylenes and oxygenated polyethylenes, polypropylene, polyesters including polyethylene terephthalate and polybutalene terephthalate, vinyl polymers including polyvinyl chloride, polyvinyl acetate, ethylene-vinyl acetate copolymers and ethylene-vinyl alcohol copolymers, polycarbonates and polystyrene, polyalkyleneoxide polymers including polyethylene oxide polymer; and mixtures thereof.

A composite film may comprise 2 or more polymers blended together.

The most preferred blended films may be selected depending upon the desired characteristics of the film. It is preferred that a composite film comprise 30 to 99% by weight based on the total weight of the composite film of a polyolefin polymer; and approximately 1 to 70% by weight based on the total weight of the composite film of a dispersing polymer selected from polyolefins, polyesters, vinyl polymers, polycarbonates, polystyrenes, polyalkylene olefin polymers and mixtures thereof.

According to a further preferred aspect of the present invention, there is provided a controlled permeability film including a composite film including
a film forming polyolefin polymer; and
a dispersing polymer; and
a modified porous filler in an amount effective to reduce the ratio of carbon dioxide to oxygen permeability of the controlled permeability film including
an inert porous filler wherein the filler has
a particle size greater than the intrinsic film thickness of the composite film, and
a surface modifying agent; the controlled permeability film being further modified to reduce the $CO_2/O_2$ permeability ratio to approximately 0.5 to 2.0.

Modifications of both the composite film and porous filler may provide improved properties, for example, higher permeabilities, better permeability/temperature behaviour, more consistent film properties and better $CO_2/O_2$ permeability ratios.

In a preferred aspect of the present invention the controlled permeability film may be utilised in the packaging of product including highly sensitive produce such as broccoli, or organisms such as nematodes. Accordingly in a preferred form there is provided a packaged product including
  a controlled permeability film as described above; and
  a product packaged therein.

The controlled permeability film may be utilised in the packaging of highly sensitive produce such as broccoli, or organisms such as nematodes.

The produce packaged may be of any suitable type sensitive to oxygen deterioration. The produce may be selected from broccoli, brussels sprouts, beans, cabbage, chicory, celery, cauliflower, radish, artichoke, lettuce, tomato, pepper, leeks, parsley, spinach, asparagus, mushroom and okra, flowers, berries, cherry, melons, mango, papaya, pineapple, avocado, persimmon, grapefruit, kiwi, nectarine, peach, apple, banana, orange, apricot, grape, cranberry, plum, pear and nashi.

The packaged produce product has been found to exhibit improved $CO_2/O_2$ permeability such that the deterioration of the produce product is significantly reduced. It will be recognised that the atmospheric oxygen and $CO_2$ concentrations may be optimised to be within the optimum ranges for a produce product. Reported optimum $O_2$ and $CO_2$ concentrations for broccoli range from approximately 1 to 2.5% and approximately 5 to 10% respectively. It is postulated that the controlled permeability package achieves extended produce life because of a slowing in respiration and inhibition of pathogen growth.

The concentration of carbon dioxide will be controlled by the respiration rate of the produce less the amount of $CO_2$ released through the film. This may be expressed $$\frac{d[CO_2]}{dt} = Resp - \frac{perm*[CO_2]*thickness\ of\ film}{area\ of\ film}$$

The concentration of oxygen is directly related to the permeance of the film to oxygen.

Thus variation in the ratio of permeability of $CO_2/O_2$ provides an ability to produce a film having optimum characteristics for any chosen produce.

The controlled permeability film utilised in this aspect of the present invention is preferably a polyethylene film, more preferably a low density polyethylene (LDPE) film. The porous filler utilised in this aspect of the present invention may be a pumice filler. It has been found that the broccoli produce may be packaged with loadings of approximately 6 to 7 kilograms per square meter utilising the controlled permeability film according to the present invention. It will be understood that the mass of produce stored relative to the area of polymer film available for gases to pass through is an important parameter effecting internal package atmosphere. Zagory et. al. (Proc. 5th Int. CA Conference, Jun. 14–16, 1989, Wenatchee, Washington) packaged broccoli at loadings of approximately 3.2 to 4.5 kilograms per square meter of polymeric film. Such loading ranges were found to be ineffective in producing optimum $CO_2$ and $O_2$ concentration.

The organisms packaged may be of any kind requiring high levels of moisture and sufficient oxygen. The organisms may be selected from nematodes, live aquatic animals or plants; and aerobic microorganisms.

The packaged organism product has improved permeabilities so that packaged organisms have improved survival and/or less maintenance requirements. For nematodes, preferred transmission rates for oxygen and carbon dioxide are:
  $O_2$-greater than $1.2 \times 10^{-17}$
  $CO_2$-greater than $4 \times 10^{-17}$ These values ensure that adequate oxygen is available and that moisture levels are maintained in the packaged organism product. Packaging of other organisms can be achieved by adjusting permeability ratios and film thickness to achieve the optimum transmission rates for a given organism.

For nematode storage, films having porous fillers with a pore size of approximately 0.1 $\mu$m are preferred. Particularly preferred are alumina particles having a particle size of from 53 $\mu$m to 75 $\mu$m and a pore size of 0.1 $\mu$m. The films used for nematode storage are preferably polyethylene films, more preferably low density polyethylene (LDPE) films. In particularly preferred embodiment, a composite film of LDPE and ultralow density polyethylene is used.

Whilst the invention has been described with reference to its use as a controlled atmosphere packaging for produce or organisms it should be understood that the applications for the controlled permeability film are not restricted thereto. Other envisioned uses for controlled permeability films are:
  monitoring respiration rates where respiration rate can be determined from the known permeability of the film and accumulation of respiration gases;
  enhancing sorbent, scavenging, or indicating polymer additives where permeation of gases or liquids through the polymer is limiting the effectiveness of the additive;
  for use in co-extruded products where the different permeabilities are required for each layer of the multilayer film;
  for packaging of meat, poultry, dairy or fish products;
  for packaging of medicines, pharmaceuticals; microorganism culture media;
  for packaging of live organs;
  energy absorbing packaging; collapsible or elastic porosity can be built into the film simultaneously with the controlled permeability;
  sachet material or similar coating material for example for containing gas sorbing or generating materials; such as sachets which may be placed inside produce container thereby modifying the atmosphere. It is possible to combine the controlled permeability film according to the present invention with other films having preferred characteristics such as high clarity or the like.

Thus according to a further aspect of the present invention there is provided a composite packaging article including
  a controlled permeability film as described above;
  a packaging film adhered along at least one edge thereof to the controlled permeability film.

It will be understood that in this form the controlled permeability film may be used on a surface of the composite packaging article and a different packaging film on another surface. For example a high density film may be used on one surface for display purposes for example a high clarity high density polyethylene film, with the controlled permeability film on another surface.

In a still further aspect of the present invention, there is provided a composite packaging article including a controlled permeability film as described above;
  a sachet or like article attached to a surface of the controlled permeability film, and including a gas sorbing or generating material.

The sachet or like article may be attached to the film in any suitable manner. The sachet may be welded or attached utilising a suitable adhesive.

The gas sorbing material contained in the sachet may include a synthetic double-layered permanganate material of the type described in International Patent Application PCT/AU91/00246 to applicants.

The present invention will now be more fully described with reference to the accompanying examples. It should be understood, however, that the description following is illustrative only and should not be taken in any way as a restriction on the generality of the invention described above.

EXAMPLE 1

A polyethylene film 15% low density and 85% linear low density was fabricated according to PCT/AU91/00346 with 2% scoria. The intrinsic film thickness was 30 micron and the particle size was 50 to 75 micron. The film was processed by passing it between two stainless steel rollers each weighing approximately 7 Kg. The rollers can be set with a predetermined distance between them and the bottom roller can move against two springs with spring constants of 0.54 $Kgmm^{-1}$. The rollers can be maintained at an elevated temperature by passing thermostatically controlled heated oil through them. In this example, the rollers were at ambient temperature with a spacing of 40 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $1.6 \times 10^{-14}$ and $1.6 \times 10^{-14}$ $mole.m^{-1}s^{-1}Pa^{-1}$.

EXAMPLE 2

As in Example 1 except the roller spacing was 80 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $2.2 \times 10^{-15}$ and $5.5 \times 10^{-15}$ $mole.m^{-1}s^{-1}Pa^{-1}$.

EXAMPLE 3

As in Example 1 except the film thickness was 20 micron. The film was processed with the rollers heated to 80° C. and a roller spacing of 0 micron. The $O_2$ and $CO_2$ permeabilities prior to this treatment were $2.5 \times 10^{-15}$ and $6.7 \times 10-15$ $mole.m^{-1}s^{-1}Pa^{-1}$ and afterwards $1.0 \times 10-13$ and $1.1 \times 10^{-13}$ $mole.m^{-1}s^{-1}Pa^{-1}$.

EXAMPLE 4

As in Example 1 except the film was processed with the rollers heated to 80° C. and a roller spacing of 0 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $3.2 \times 10^{-1}$ and $3.1 \times 10^{-13}$ $mole.m^{-1}s^{-1}Pa^{-1}$.

EXAMPLE 5

As in Example 4 except the roller spacing was 40 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $4.4 \times 10^{-14}$ and $3.4 \times 10^{-14}$ $mole.m^{-1}s^{-1}Pa^{-1}$.

EXAMPLE 6

As in Example 4 except the roller spacing was 80 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $2.4 \times 10^{-15}$ and $6.5 \times 10^{-15}$ $mole.m^{-1}s^{-1}Pa^{-1}$.

EXAMPLE 7

As in Example 4 except the intrinsic film thickness was 50 micron. The $O_2$ and $CO_2$ permeabilities prior to this treatment were $1.8 \times 10^{-15}$ and $5.6 \times 10^{-15}$ $mole.m^{-1}s^{-1}Pa^{-1}$ and afterwards $1.7 \times 10^{-13}$ and $2.0 \times 10-1$ $mole.m^{-1}s^{-1}Pa^{-1}$.

EXAMPLE 8

As in Example 4 except the intrinsic film thickness was 80 micron. The $O_2$ and $CO_2$ permeabilities prior to this treatment were $1.1 \times 10^{-15}$ and $4.0 \times 10^{-15}$ $mole.m^{-1}s^{-1}Pa^{-1}$ and afterwards $2.7 \times 10^{-15}$ and $4.9 \times 10^{-15}$ $mole.m^{-1}s^{-1}Pa^{-1}$.

EXAMPLE 9

As in Example 8 except the roller spacing was 80 micron. The $O_2$ and $CO_2$ permeabilities prior to this treatment were $1.1 \times 10^{-15}$ and $4.0 \times 10^{15}$ $mole.m^{-1}s^{-1}Pa^{-1}$ and afterwards $1.8 \times 10^{-15}$ and $4.2 \times 10^{-14}$ $mole.m^{-1}s^{-1}Pa^{-1}$.

EXAMPLE 10

A polyethylene film 15% low density and 85% linear low density was fabricated according to PCT/AU91/00346 with 0.5% scoria. The intrinsic film thickness was 20 micron and the particle size was 50 to 75 micron. The film was processed with the rollers at ambient temperature and a roller spacing of 0 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $1.7 \times 10^{-14}$ and $1.3 \times 10^{-14}$ $mole.m^{-1}s^{-1}Pa^{-1}$.

EXAMPLE 11

As in Example 10 except the intrinsic film thickness was 30 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $5.7 \times 10^{-14}$ and $3.7 \times 10^{-14}$ $mole.m^{-1}s^{-1}Pa^{-1}$.

EXAMPLE 12

As in Example 11 except the roller spacing was 40 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $1.2 \times 10^{-14}$ and $8.4 \times 10^{-15}$ $mole.m^{-1}s^{-1}Pa^{-1}$.

EXAMPLE 13

As in Example 11 except the roller spacing was 80 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $1.9 \times 10^{-15}$ and $4.8 \times 10^{-15}$ $mole.m^{-1}s^{-1}Pa^{-1}$.

EXAMPLE 14

As in Example 10 except the film thickness was 50 micron. The $O_2$ and $CO_2$ permeabilities prior to this treatment were $1.8 \times 10^{-15}$ and $5.6 \times 10^{-15}$ $mole.m^{-1}s^{-1}Pa^{-1}$ and afterwards $1.8 \times 10^{-14}$ and $1.4 \times 10^{-14}$ $mole.m^{-1}s^{-1}Pa^{-1}$.

EXAMPLE 15

As in Example 10 except the rollers were heated at 80° C. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $1.2 \times 10^{-13}$ and $7.0 \times 10^{-14}$ $mole.m^{-1}s^{-1}Pa^{-1}$.

EXAMPLE 16

As in Example 15 except the intrinsic film thickness was 30 micron. The $O_2$ and $CO_2$ permeabilities prior to this treatment were $2.5 \times 10^{-15}$ and $6.7 \times 10^{-15}$ $mole.m^{-1}s^{-1}Pa^{-1}$ and afterwards $7.8 \times 10^{-14}$ and $5.7 \times 10^{-15}$ $mole.m^{-1}s^{-1}Pa^{-1}$.

EXAMPLE 17

As in Example 16 except the roller spacing was 40 micron. The $O_2$ and $CO_2$ permeabilities prior to this treat-

EXAMPLE 18

As in Example 16 except the roller spacing was 80 micron. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $3.7\times10^{-15}$ and $6.8\times10^{-15}$ mole.m$^{-1}$s$^{-1}$Pa$^{-1}$.

EXAMPLE 19

As in Example 15 except the intrinsic film thickness was 50 micron. The $O_2$ and $CO_2$ permeabilities prior to this treatment were $1.8\times10^{-15}$ and $5.6\times10^{-15}$ mole.m$^{-1}$s$^{-1}$Pa$^{-1}$ and afterwards $2.2\times10^{-14}$ and $2.1\times10^{-14}$ mole.m$^{-1}$s$^{-1}$Pa$^{-1}$.

EXAMPLE 20

As in Example 15 except the intrinsic film thickness was 80 micron. The $O_2$ and $CO_2$ permeabilities prior to this treatment were $1.1\times10^{-15}$ and $4.0\times10^{-15}$ mole.m$^{-1}$s$^{-1}$Pa$^{-1}$ and afterwards $0.9\times10^{-15}$ and $3.2\times10^{-15}$ mole.m$^{-1}$s$^{-1}$Pa$^{-1}$.

EXAMPLE 21

As in Example 20 except the roller spacing was 80 micron. The $O_2$ and $CO_2$ permeabilities prior to this treatment were $1.1\times10^{-15}$ and $4.0\times10^{-15}$ mole.m$^{-1}$s$^{-1}$Pa$^{-1}$ and afterwards $0.9\times10^{-15}$ and $3.4\times10^{-15}$ mole.m$^{-1}$s$^{-1}$Pa$^{-1}$.

EXAMPLE 22

A polyethylene film 15% low density and 85% linear low density was fabricated according to PCT/AU91/00346 with 0.05% scoria. The intrinsic film thickness was 20 micron and the particle size was 50 to 75 micron. The film was processed with the rollers at ambient temperature and a roller spacing of 0 micron. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $9.4\times10^{-15}$ and $9.0\times10^{-15}$ mole.m$^{-1}$s$^{-1}$Pa$^{-1}$.

EXAMPLE 23

As in Example 22 except the intrinsic film thickness was 30 micron. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $3.3\times10^{-15}$ and $7.2\times10^{-15}$ mole.m$^{-1}$s$^{-1}$Pa$^{-1}$.

EXAMPLE 24

As in Example 22 except the intrinsic film thickness was 50 micron. The $O_2$ and $CO_2$ permeabilities prior to this treatment were $1.8\times10^{-15}$ and $5.6\times10^{-15}$ mole.m$^{-1}$s$^{-1}$Pa$^{-1}$ and afterwards $2.3\times10^{-15}$ and $6.0\times10^{-15}$ mole.m$^{-1}$s$^{-1}$Pa$^{-1}$.

EXAMPLE 25

As in Example 22 except the intrinsic film thickness was 80 micron. The $O_2$ and $CO_2$ permeabilities prior to this treatment were $1.1\times10^{-15}$ and $4.0\times10^{-15}$ mole.m$^{-1}$s$^{-1}$Pa$^{-1}$ and afterwards $0.96\times10^{-15}$ and $4.2\times10^{-15}$ mole.m$^{-1}$s$^{-1}$Pa$^{-1}$.

EXAMPLE 26

As in Example 22 except the roller temperature was 80° C. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $1.8\times10^{-14}$ and $1.8\times10^{-14}$ mole.m$^{-1}$s$^{-1}$Pa$^{-1}$.

EXAMPLE 27

As in Example 26 except the intrinsic film thickness was 30 micron. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $2.6\times10^{-14}$ and $5.6\times10^{-14}$ mole.m$^{-1}$s$^{-1}$Pa$^{-1}$.

EXAMPLE 28

As in Example 26 except the intrinsic film thickness was 50 micron. The $O_2$ and $CO_2$ permeabilities prior to this treatment were $1.8\times10^{-15}$ and $5.6\times10^{-15}$ mole.m$^{-1}$s$^{-1}$Pa$^{-1}$ and afterwards $8.8\times10^{-15}$ and $1.5\times10^{-14}$ mole.m$^{-1}$s$^{-1}$Pa$^{-1}$.

EXAMPLE 29

As in Example 26 except the intrinsic film thickness was 80 micron. The $O_2$ and $CO_2$ permeabilities prior to this treatment were $1.1\times10^{-15}$ and $4.0\times10^{-15}$ mole.m$^{-1}$s$^{-1}$Pa$^{-1}$ and afterwards $1.1\times10^{-15}$ and $4.2\times10^{-15}$ mole.m$^{-1}$s$^{-1}$Pa$^{-1}$.

EXAMPLE 30

As in Example 29 except the roller spacing was 80 micron. The $O_2$ and $CO_2$ permeabilities prior to this treatment were $1.1\times10^{-15}$ and $4.0\times10^{-15}$ mole.m$^{-1}$s$^{-1}$Pa$^{-1}$ and afterwards $1.8\times10^{-15}$ and $4.1\times10^{-15}$ mole.m$^{-1}$s$^{-1}$Pa$^{-1}$.

EXAMPLE 31

As in Example 22 except the roller temperature was 100° C. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $7.8\times10^{-15}$ and $5.8\times10^{-15}$ mole.m$^{-1}$s$^{-1}$Pa$^{-1}$.

EXAMPLE 32

As in Example 31 except the intrinsic film thickness was 30 micron. The $O_2$ and $CO_2$ permeabilities prior to this treatment were $2.5\times10^{-15}$ and $6.7\times10^{-15}$ mole.m$^{-1}$s$^{-1}$Pa$^{-1}$ and afterwards $1.2\times10^{-14}$ and $1.2\times10^{-14}$ mole.m$^{-1}$s$^{-1}$Pa$^{-1}$.

EXAMPLE 33

As in Example 31 except the intrinsic film thickness was 50 micron. The $O_2$ and $CO_2$ permeabilities prior to this treatment were $1.8\times10^{-15}$ and $5.6\times10^{15}$ mole.m$^{-1}$s$^{-1}$Pa$^{-1}$ and afterwards $2.1\times10^{-15}$ and $4.9\times10^{-15}$ mole.m$^{-1}$s$^{-1}$Pa$^{-1}$.

EXAMPLE 34

As in Example 31 except the intrinsic film thickness was 80 micron. The $O_2$ and $CO_2$ permeabilities prior to this treatment were $1.1\times10^{-15}$ and $4.0\times10^{-15}$ mole.m$^{-1}$s$^{-1}$Pa$^{-1}$ and afterwards $1.1\times10^{-15}$ and $4.2\times10^{-15}$ mole.m$^{-1}$s$^{-1}$Pa$^{-1}$.

EXAMPLE 35

38.7 g(20 mL) of alumina, pore size $0.1\mu$, particle size 53–75$\mu$, was mixed with 260 g of low density polyethylene. 150 g of this master batch was added to 350 g of ultralow density polyethylene and film blown, thickness $27\mu$. The film was processed as described in example 1 at 90° C. with a roller spacing of $0\mu$. The permeability of the film to $O_2$ was measured as $1.6\times10^{-13}$ mole/m.s.Pa and to $CO_2$ was measured as $3.1\times10^{-13}$ mole/m.s.Pa.

EXAMPLE 36

The film as described in example 35 was processed at 105° C., with a roller spacing of $40\mu$, and the $O_2$ permeability found to be $1.9\times10^{-13}$ mole/m.s. Pa and the $CO_2$ permeability $1.8\times10^{-13}$ mole/m.s.Pa.

EXAMPLE 37

22.6 g(20 mL) of alumina, pore size $0.01\mu$, particle size 53–75$\mu$, was mixed with 260 g of low density polyethylene.

150 g of this master batch was added to 350 g of ultralow density polyethylene and film blown, thickness $21\mu$. The film was processed as described in example 1 at 90° C. with a roller spacing of $0\mu$. The permeability of the film to $O_2$ was measured as $7.4 \times 10^{-13}$ mole/m.s.Pa and to $CO_2$ was measured as $4.9 \times 10^{-13}$ mole/m.s.Pa.

EXAMPLE 38

The film as described in Example 37 was processed at 105° C., with a roller spacing of $40\mu$, and the $O_2$ permeability found to be $1.2 \times 10-14$ mole/m.s.Pa and the $CO_2$ permeability $1.2 \times 10^{-14}$ mole/m.s. Pa.

EXAMPLE 39

45.9 g(20 mL) of alumina, pore size $2\mu$, particle size $53–75\mu$, was mixed with 360 g of low density polyethylene. 150 g of this master batch was added to 350 g of ultralow density polyethylene and film blown, thickness $35\mu$. The film was processed as described in example 1 at 90° C. with a roller spacing of $0\mu$. The permeability of the film to $O_2$ was measured as $6.9 \times 10^{-13}$ mole/m.s.Pa and to $CO_2$ was measured as $6.5 \times 10^{-13}$ mole/m.s.Pa mole/m.s.Pa.

EXAMPLE 40

The film as described in Example 39 was processed at 105° C., with a roller spacing of $40\mu$, and the $O_2$ permeability found to be $2.0 \times 10^{-14}$ mole/m.s.Pa and the $CO_2$ permeability $5.1 \times 10^{-14}$ mole/m.s.Pa.

We claim:

1. A process for preparing a controlled permeability film which includes:

providing a film forming polyolefin polymer; and an inert porous filler in an amount effect to reduce the ratio of $CO_2$ permeability to the $O_2$ permeability of the film, and wherein the filler has a particle size greater than the intrinsic film thickness of the film forming polymer to be prepared:

mixing the polyolefin polymer and inert porous filler at elevated temperature;

forming the mixture into a film of intrinsic thickness less than the particle size; and subjecting the film to a permeability modifying step such that the $CO_2/O_2$ permeability ratio is reduced to approximately 0.5 to 2.0 wherein the permeability modifying step includes a compression treatment comprising applying a compressive force to the film with a plate or roller, wherein the compressive force is sufficient to thin or remove film forming material between the filler particles and the atmosphere.

2. A process according to claim 1 wherein the permeability modifying step is such that the $CO_2/O_2$ permeability ratio is reduced to approximately 0.5 to 1.5.

3. A process according to claim 1 wherein the compressive force is in the range of approximately 2.5 kg to 100 kg.

4. A process according to claim 1 wherein the compressive force is in the range of approximately 5 kg to 75 kg.

5. A process according to claim 1 wherein the permeability modifying step includes subjecting the film to a uniaxial stretching, wherein the stretching force is approximately 2.5 kg to 75 kg.

6. A process according to claim 1 wherein the stretching force is approximately 5 kg to 50 kg.

7. A process according to claim 1 wherein the permeability modifying step is conducted at a temperature of approximately 10° C. to 200° C.

8. A process according to claim 1 wherein the permeability modifying step is conducted at a temperature of approximately 75° C. to 115° C.

9. A controlled permeability film produced by a process according to claim 1, wherein the film includes:

a film forming polyolefin polymer; and an inert porous filler in an amount effective to reduce the ratio of $CO_2$ permeability to $O_2$ permeability of the film; wherein the filler has a particle size greater than the intrinsic film thickness of the film forming polymer, the controlled permeability film being further modified to reduce the $CO_2/O_2$ permeability ratio to approximately 0.5 to 2.0.

10. A controlled permeability film according to claim 9 wherein the $CO_2/O_2$ permeability ratio is further modified to approximately 0.5 to 1.5.

11. A film according to claim 9 wherein the polyolefin polymer is selected from polyethylene and blends of polyethylene with polyesters, including polyethylene terephthalate and polybutylene terephthalate, vinyl polymers including polyvinyl chloride, polyvinyl acetate, ethylene-vinyl acetate copolymers and ethylene-vinyl alcohol copolymers, polycarbonates and polystyrenes and polyalkylene oxide polymers including polyethylene oxide polymer.

12. A film according to claim 9 wherein the film forming polyolefin polymer is a low density polyethylene.

13. A film according to claim 9 wherein the inert porous filler is selected form pumice, tuff, rhyolite, dacite, reticulite, scoria, lapilli, agglomerate, perlite, pumicite, volcanic rocks, natural zeolites or sandstones; coal, char, charcoal, starch, seaweed, polymeric carbohydrates; porous glasses, clays modified to produce porosity, cordierite, mullite; alumina, silica, zirconia, magnesia, cerium compounds; polyvinyl alcohol and polyacrylamide.

14. A film according to claim 9 wherein the inert porous filler consists of pumice particles having a particle size greater than the intrinsic film thickness of film forming polymer.

15. A film according to claim 9 wherein the inert porous filler consists of alumina particles having a particle size greater than the intrinsic film thickness of the film forming polymer.

16. A film according to claim 9 wherein the inert porous filler includes a surface modifying agent coated thereon in an amount effective to modify the surface behaviour of the porous filler.

17. A film according to claim 16 wherein the surface modifying agent renders the surface of the porous filler hydrophobic.

18. A film according to claim 16 wherein the surface modifying agent is selected from polyethylene glycols, nonylaphenyl polyethylene oxide, polyvinyl alcohols, polyvinyl acetates, parafins, polysiloxanes and silane coupling agents, metal alkoxides, alcohols and combinations thereof.

19. A controlled permeability film produced by the process of claim 1 wherein the film includes:

a film forming polyolefin polymer; and a disbursing polymer and an inert porous filler in an amount effective to reduce the ratio of $CO_2$ permeability to the $O_2$ permeability of the film, and wherein the film has a particle size greater than the intrinsic film thickness of the composite film; the controlled permeability film being further modified to reduce the $CO_2/O_2$ permeability ratio to approximately 0.5 to 2.0.

20. A controlled permeability film according to claim 19 wherein the inert porous filler is a modified porous filler including a surface modifying agent.

21. A packaged product including:

a controlled permeability film as defined in claim 9, and a product packaged therein.

22. A packaged product according to claim 21 wherein the product is selected from broccoli, brussel sprouts, beans, cabbage, chicory, celery, cauliflower, radish, artichoke, lettuce, tomatoe, pepper, leeks, parsley, spinach, asparagus, mushroom, okra, flowers, berries, cherries, melons, mango, papaya, pineapple, avocado, persimmon, grapefruit, kiwi fruit, nectarine, peach, apple, banana, orange, apricot, grape, cranberry, plum, pear and nashi.

23. A packaged product according to claim 21 wherein the product is selected from nematodes, live aquatic animals, live aquatic plants and aerobic microorganisms.

24. A composite packaging article including a controlled permeability film as defined in claim 9; and a packaging film adhered along at least one edge thereof to the controlled permeability film.

25. A composite packaging article according to claim 24 wherein a sachet including a gas sorbing or generating material is attached to a surface of the controlled permeability film.

* * * * *